Patented Jan. 5, 1943

2,307,641

UNITED STATES PATENT OFFICE

2,307,641

POLYMERIZATION OF ROSIN AND ROSIN ESTERS

Alfred L. Rummelsburg, Wilmington, Del., assignor to Hercules Powder Company, Wilmington, Del., a corporation of Delaware No Drawing. Application June 12, 1940, Serial No. 340,095

14 Claims. (Cl. 260—97)

This invention relates to a method of polymerizing rosin, rosin esters and mixtures thereof and more particularly to such a process wherein the polymerizing agent comprises an organic substituted inorganic polybasic acid.

Rosin has heretofore been treated with sulfuric acid to increase its melting point by polymerization. U. S. Patent No. 2,017,866 to Morton discloses a process by which a gasoline solution of rosin is treated with sulfuric acid to polymerize the rosin and thereby increase its melting point. The polymerization of rosin in solution in a volatile, halogenated organic solvent with sulfuric acid is disclosed in Rummelsburg U. S. Patent No. 2,136,525. Polymerization of rosin in solution in a monocyclic aromatic hydrocarbon solvent such as benzene with sulfuric acid is disclosed in U. S. Patent No. 2,108,928 to Rummelsburg. While sulfuric acid is an exceedingly active polymerizing agent for rosin, it has the disadvantage that great care must be exercised in its use to avoid charring the rosin. In addition, the use of sulfuric acid presents difficulties from the standpoint of equipment used due to its corrosive action and other disadvantages.

It is an object of the present invention to provide an improved process for polymerizing rosin and rosin esters which overcomes to a large extent the disadvantages of previous polymerizing methods.

Another object is to provide a process of polymerizing rosin and rosin esters wherein the polymerization is brought about by a catalyst which presents the advantages of sulfuric acid without the disadvantages thereof.

Other objects will more fully hereinafter appear.

I have found that organic substituted sulfuric acids are active polymerizing agents for rosin, rosin esters and mixtures of rosin and rosin esters, and do not show the disadvantages inherent in the use of sulfuric acid as the polymerizing agent. These materials are milder in their action and permit the use of higher temperatures than can satisfactorily be used in the polymerization of rosin and rosin esters with sulfuric acid, thereby allowing a more rapid polymerization. The rapid polymerization possible with the organic substituted sulfuric acids shortens the reaction period required for the production of a given increase in the melting point of the rosin or rosin ester and therefore presents very substantial advantages from the standpoint of manufacturing procedure.

The method in accordance with my invention consists essentially of treating a solution of rosin or rosin ester in a suitable solvent with an organic substituted sulfuric acid under conditions such as to bring about substantial polymerization of the rosin or rosin ester without substantial combination of the polymerizing agent with the rosin or rosin ester.

As the organic substituted sulfuric acid, I may use the mono-acyl derivatives, such as the following mono-acyl derivatives: acetyl, propionyl, n-butyryl, isobutyryl, n-valeryl, isovaleryl, benzoyl, anisyl, phthalyl, o-methoxybenzoyl, etc. I have found that acetyl sulfuric acid, which is the mono-acetyl substitution product of sulfuric acid, is a particularly valuable polymerizing agent. The alkyl substitution products of sulfuric acid are equally valuable and particularly the mono-alkyl derivatives, such as monomethyl sulfuric acid, monoethyl sulfuric acid, and the following additional mono derivatives: n-propyl, isopropyl, n-butyl, isobutyl, amyl, etc. Instead of employing the straight mono-alkyl substitution products, I may employ the mono-aryl derivatives, such as phenyl sulfuric acid, or the mono-aralkyl derivatives, such as benzyl sulfuric acid. In general, I prefer to use the more easily and more readily available materials and especially monoethyl sulfuric acid which may be readily prepared.

Instead of the pure alkyl or acyl sulfuric acids, the crude acids can be employed in the process of the present invention with almost equally satisfactory results, and in this way, the difficulty and expense of purification may be avoided.

Crude or technical acetyl sulfuric acid can be prepared by treating glacial acetic acid with concentrated sulfuric acid, by treating acetic anhydride with concentrated sulfuric acid, or by treating acetic acid with sulfur trioxide. Thus, by dissolving 34 parts of sulfur trioxide in 242 parts of glacial acetic acid at about 20° C., there is obtained 276 parts of crude acetyl sulfuric acid containing 90 to 98% of acetyl sulfuric acid. Likewise, by adding 200 parts by weight of concentrated (95%) sulfuric acid slowly to 256 parts by weight of acetic anhydride with ice cooling, there results 456 parts by weight of crude acetyl sulfuric acid. The latter was the material used in Examples 3 to 7.

Crude ethyl sulfuric acid may be made according to the method of Claessor (J. pr. Chem. (2) 19, 246) by mixing three mols of ethyl alcohol with one mol of sulfuric acid and heating the mixture for about four hours at about 100° C. on the water bath. Thus, the ethyl sulfuric acid catalyst used in Examples 1 and 2 below was made by heating 276 parts by weight of anhydrous ethyl alcohol and 206 parts by weight of 95% H₂SO₄ on the steam bath, which resulted in 482 parts by weight of crude ethyl sulfuric acid. According to Claesson, about 77.4% of the sulfuric acid has formed ethyl sulfuric acid, so that the product contains about 52% of ethyl sulfuric acid. Ethyl sulfuric acid may also be made by reacting anhydrous ethyl alcohol with sulfur trioxide at ordinary temperatures.

More particularly, my invention comprises treating the rosin or rosin ester preferably in solution in a volatile organic solvent which is inert with respect to the polymerizing agent employed, the concentration of the rosin or rosin ester in the solvent varying from about 10% to about 75% by weight, the catalyst being added to the solution with agitation and the agitation preferably being continued for a suitable time of reaction. The temperature may vary from 0° C. or below 0° C. to considerably above room temperature, for example, up to 100° C. in the case of a short reaction period. The higher temperatures promote more rapid reaction and possibly a higher degree of polymerization, but at the same time, they tend to increase the color of the product. It is preferred to maintain the temperature within the range of from about 15° C. to about 35° C. if moderate polymerization is desired. Temperatures up to 100° C. give maximum polymerization in the shortest reaction time, but darker colored products result under these conditions.

As a suitable inert solvent for the material being treated there may be employed benzene, toluene, suitable cuts of petroleum hydrocarbon, such as saturated petroleum hydrocarbons, such as hexane, octane, gasoline (which is free from olefines), petroleum ether, V. M. & P. naphtha, etc., chlorinated hydrocarbon solvents, such as ethylene dichloride, carbon tetrachloride, trichlorethylene, chlorinated benzene, chlorinated toluene, hydrogenated cyclic hydrocarbons, such as cyclohexane, decahydronaphthalene, etc.

The time during which the reaction is carried out may be varied within relatively wide limits from a period of time from one hour or less up to a considerably longer time such as eight hours or more. In general, it is preferred to carry out the reaction in a period of time varying from about one hour to about five hours, and within this range between one and one-fourth hours and two and one-half hours. As stated previously, the length of time of reaction will depend upon the temperature maintained throughout the reaction period, being shorter the higher the temperature of reaction.

The concentration of rosin or rosin ester in the solution may vary widely as stated above. The higher concentrations tend to give a more rapid reaction rate and a higher degree of polymerization. While the concentration may vary from 10 to 75% by weight, it is preferred to employ a concentration within the range of from about 20% to about 40% by weight of the solution. Lower concentrations in the solution favor the production of the lighter colored products at the expense of the increase secured in the melting point of the rosin or rosin ester. High concentrations favor the production of the greatest increase in the melting point in the shortest period of time and with the use of minimum amounts of catalyst. Likewise, high concentrations favor a maximum reduction in the unsaturation of the rosin or rosin ester in the shortest reaction time. In general, a concentration of 30 to 35% by weight will be most suitable.

The amount of organic substituted sulfuric acid employed may range from about 5% to about 150% by weight based on the weight of material being treated. However, it is preferred to employ the polymerizing catalyst within the range of from about 20 to about 60% by weight based on the weight of rosin or rosin ester being treated. It will usually be found preferable to employ the crude or technical catalyst such as crude or technical acetyl sulfuric acid or ethyl sulfuric acid, since it has been found that the crude or technical material operates fully as satisfactorily as the purer material, it being necessary merely to employ more of the crude or impure material proportionately to its content of organic substituted organic acid in order to obtain the same result. The catalyst ranges set forth above are based on the actual content of pure organic substituted sulfuric acid.

When using certain solvents such as the petroleum hydrocarbons, such as gasoline, hexane, octane, etc., aromatic hydrocarbons, such as benzene, etc., there forms during the reaction a sludge which comprises a molecular association product between the polymer and the polymerizing agent employed, and by washing it with water it may be decomposed to yield the polymeric rosin or rosin ester which may be extracted with any suitable solvent as, for example, with ether. When using other solvents such as ethylene dichloride, trichlorethylene, carbon tetrachloride, etc., the molecular association product of the polymerizing agent and the polymer may be soluble in the solvent in which case no sludge is obtained. In such case, the molecular association product is decomposed by washing the solution with water. The absence of sludge formation is in some cases undesirable because the color of the product is darker than in the case where a sludge formed.

After the completion of the reaction or after reaction to the desired extent, the mixture may be treated by two different methods to recover the polymeric products therefrom. In accordance with the first of these methods, the mixture is treated with an excess of water after which layer separation is allowed to take place, whereupon the solution of polymer in the volatile organic solvent is separated from the aqueous layer containing the catalyst, washed and the rosin or rosin ester recovered therefrom by evaporating the solvent. In accordance with the other procedure which is particularly applicable where a sludge forms, the solution of polymer in the volatile organic solvent is decanted from the acid sludge with or without the previous addition of additional solvent in order to facilitate separation of the layers. The solution of polymer is then washed with water and the solvent evaporated to recover the polymeric rosin or rosin ester. If desired, the reaction mixture may be treated with water without separation of sludge, whereby the molecular association product is decomposed and additional polymerized rosin or rosin ester is returned to the solution of polymer. Prior to or after washing of the solution of polymer, it may be contacted with absorbent material such as fuller's earth, activated clay, activated carbon, etc. for the removal of color bodies. The solution of polymer is then evaporated so as to remove the solvent and recover the polymeric rosin or rosin ester. If desired, the separated sludge may be decomposed with water and then extracted with a suitable solvent, or it may be extracted without previous decomposition with water. In either case, a highly polymerized dark-colored material is obtained. In most cases, the product obtained by the latter treatment wherein decantation from the sludge is carried out has a lighter color than that obtained by the first procedure, wherein the mixture is treated without separation of the sludge if any has formed.

In general, it will be found better to add the catalyst to an agitated solution of rosin or rosin esters, although the reverse order may be employed in which the solution of rosin or rosin esters is added to the catalyst which is agitated. In the washing treatment referred to, it may be necessary to employ electrolytes in the wash water in order to break any emulsion. The washing of the solution to remove the catalyst may be performed with hot or cold water, or with aqueous solutions of electrolytes such as salt, or in some cases, dilute alkali.

Either a batch or a continuous process of polymerization may be employed. For example, a solution of rosin or rosin ester and the polymerizing catalyst may be continuously and separately introduced to a polymerizing zone where polymerization takes place and from which the reaction mixture is continuously removed and treated to recover the polymer, the solvent and catalyst being separated and purified and if desired recycled in the process.

Various types of rosin, such as gum rosin or wood rosin may be treated in accordance with the present invention. The rosin employed may have been previously purified or treated by any one of a large number of methods. For example, the rosin may be heat treated, partially distilled, selective solvent refined, etc. Instead of rosin, abietic acid may be polymerized or equivalents of abietic acid such as pimaric acid, sapinic acid, etc.

Numerous types of rosin esters may be treated by the polymerizing process of the present invention. For example, ester gum, or other polyhydric alcohol esters of rosin may be treated. Similarly, monohydric aliphatic esters of rosin such as methyl, ethyl, propyl, etc., esters of abietic acid, or aromatic esters, such as phenol, or naphthol, or other esters of abietic acid may be polymerized by the present invention. Instead of treating either rosin or a rosin ester, a mixture thereof in any proportion may be treated by the present invention.

The polymerized product of the present invention is characterized by an increase in melting point, as a result of polymerization, ranging from about 3° C. to about 50° C. Frequently, the product has a materially improved color. Rosin polymerized in accordance with the process of the present invention may have its acid number substantially changed from the original, the acid number being controlled by varying the conditions of polymerization. By the use of higher reaction temperatures (near 100° C.) and larger amounts of catalyst (40 to 60% by weight based on the weight of rosin) a polymerized rosin having a markedly lower acid number than the original, say as low as 120, may be obtained.

Following are typical examples of various methods of carrying the present invention into practice:

Example 1

To 830 g. of a 30% by weight solution of I wood rosin in benzol, there was added with vigorous stirring 140 g. of crude ethyl sulfuric acid, the mixture being maintained at 15 to 18° C. during the addition. The addition consumed fifteen minutes. Agitation was continued beyond this period at 20° C. for 1½ hours. Agitation was now ceased and the liquid sludge was allowed to settle. The supernatant solution of polymer in benzene was then decanted from the sludge layer, washed with water and evaporated to recover the polymerized rosin.

The sludge was treated with an excess of water to decompose the polymerized rosin-ethyl sulfuric acid condensation or addition product, extracted with ether, and the ether extract washed with water and evaporated to recover the polymerized rosin therefrom. The polymerized rosin which was obtained from the benzol layer in about a 90% yield, had an acid number of 165 and a melting point of 87° C., and a color of F+. The original rosin had an acid number of 163, a melting point of 80° C., and a color of I. The polymerized rosin obtained upon extraction of the sludge as described was a dark colored product. If the reaction temperature is increased to about 30° C.–35° C., a product melting at 100° C.–105° C. results.

Example 2

The same procedure as that in example 1 was followed, except that gasoline was used as the solvent instead of benzol. The product obtained from the gasoline layer had a melting point of 83° C.

Example 3

To 500 g. of a 35% by weight solution of I wood rosin in benzol, 100 g. of crude acetyl sulfuric acid was added with vigorous agitation, the addition consuming about ten minutes. Agitation was continued for about 1¼ hours at 20° C. At the expiration of this period, the mixture was allowed to stand for five minutes to allow the smudge layer to separate. Thereupon, the solution was decanted from the sludge, was shaken with four grams of Darco (a commercial form of activated carbon), filtered, washed with water, and evaporated to recover the polymerized rosin. The polymerized produce was recovered in the yield of 85–90%, and had an acid number of 157, a saponification number of 163, a melting point of 96° C., and a color of about H. The sludge was extracted with ether as in Example 1 and yielded a dark colored product.

Example 4

To 770 g. of a 30% by weight solution of I wood rosin in V. M. & P. naphtha, 105 g. of crude acetyl sulfuric acid were added with vigorous agitation. Addition took about fifteen minutes. Agitation was then continued for 2½ hours at 20° C. The mixture was allowed to undergo layer formation, whereupon the solution layer was decanted from the sludge layer, washed with water and evaporated to recover the rosin polymer contained therein. A 90% yield was obtained. The product had an acid number of 169, a melting point of 89° C., and a color of about M. It will be seen that in this example, the color of the rosin polymer was improved materially over that of the original rosin.

Example 5

800 g. of a 60% by weight solution of WG gum rosin in V. M. & P. naphtha were agitated while 300 g. of crude acetyl sulfuric acid were added during 15–20 minutes at 20° C. Agitation was continued for a period of 3 hours at 30–35° C. The reaction mixture was then divided into two equal parts, A and B.

Portion A was agitated with 500 cc. of water at 25–35° C. for about 15 minutes and the polymerized rosin solution then water washed. Evaporation of solvent left a 99+% yield of polymerized rosin having the following characteristics:

|  | Original | Treated |
|---|---|---|
| Acid number | 164 | 155 |
| Color | WG | H |
| Melting point °C | 83 | 109 |
| (SCN)₂ value | 95 | 75 |

Portion B was diluted with 600 g. V. M. & P. naphtha. The naphtha solution was then decanted from the sludge and water washed. Evaporation of solvent left an 80% yield of polymerized rosin.

|  | Original | Treated |
|---|---|---|
| Acid number | 164 | 159 |
| Color | WG | N+ |
| Drop melting point °C | 83 | 105 |
| (SCN)₂ value | 95 | 80 |

Treatment of the sludge with water, followed by extraction with naphtha and water washing gave a dark colored polymerized rosin after evaporation of solvent.

*Example 6*

400 g. of a 60% by weight solution of WG gum rosin in V. M. & P. naphtha were agitated while 75 g. of crude acetyl sulfuric acid were added during 5 minutes at 20° C. Agitation was then continued for 15 minutes at 50° C. About 250 g. water was added with agitation and cooling during 15 minutes at 20° C. The reaction mixture was water washed, and the solvent evaporated in vacuo leaving a 97% yield of polymerized rosin having the following properties:

|  | Original | Treated |
|---|---|---|
| Acid number | 164 | 157 |
| Color | WG | I |
| Melting point °C | 83 | 110 |
| (SCN)₂ value | 95 | 80 |

*Example 7*

To a solution of 300 g. ester gum in 500 g. benzene was added 125 g. crude acetyl sulfuric during 15 minutes with agitation at 20° C. Agitation was then continued for a period of 2 hours at 20° C. The benzene solution was decanted from the sludge and water washed with hot water containing several percent of NaCl in order to reduce emulsification. The solvent was evaporated in vacuo.

|  | Original | Treated |
|---|---|---|
| Acid number | 8 | 7 |
| Color | N | K |
| Drop melting point °C | 89 | 110 |
| (SCN)₂ value | 88 | 65 |

*Example 8*

100 g. of crude acetyl sulfuric acid was added to a solution of 300 g. ester gum in 500 g. ethylene dichloride during 10 minutes with agitation at 15° C. Agitation was then continued at 20° C. for one hour. About 200 cc. of water was then added during 10 minutes with agitation at 20–25° C. The reaction mixture was then water washed as above, and the solvent evaporated in vacuo.

|  | Original | Treated |
|---|---|---|
| Acid number | 8 | 5 |
| Color | N | F |
| Drop melting point °C | 89 | 130 |
| (SCN)₂ value | 88 | 60 |

It will be understood that the details and examples given herein are illustrative only, and in no way limit the invention as broadly described and claimed.

What I claim and desire to protect by Letters Patent is:

1. The process of polymerizing a material selected from the group consisting of rosin and rosin esters, which comprises treating said material in solution in a volatile organic solvent with a polymerizing agent selected from the group consisting of mono-acyl and mono-alkyl substitution products of sulfuric acid at a temperature within the range of from about 0° C. to about 100° C. for a period of time sufficient to bring about substantial polymerization of said material without substantial combination of said agent with said material.

2. The process of polymerizing a material selected from the group consisting of rosin and rosin esters, which comprises treating said material in solution in a volatile organic solvent with a polymerizing agent selected from the group consisting of mono-acyl and mono-alkyl substitution products of sulfuric acid at a temperature within the range of from about 15° C. to about 35° C. for a period of time sufficient to bring about substantial polymerization of said material without substantial combination of said agent with said material.

3. The process of polymerizing a material selected from the group consisting of rosin and rosin esters, which comprises treating said material in solution in a volatile organic solvent, the concentration of said material in said solvent ranging from about 10% to about 75% by weight, with a polymerizing agent selected from the group consisting of the mono-acyl and mono-alkyl substitution products of sulfuric acid at a temperature within the range of from about 15° C. to 35° C. for a period of time sufficient to bring about substantial polymerization of said material without substantial combination of said agent with said material.

4. The process of polymerizing a material selected from the group consisting of rosin and rosin esters, said material in solution in a volatile organic solvent with a polymerizing agent selected from the group consisting of the mono-acyl and mono-alkyl substitution products of sulfuric acid, the proportion of said agent varying within the range from about 5% to about 150% by weight based on the weight of said material, at a temperature within the range of from about 15° C. to about 35° C. for a period of time sufficient to bring about substantial polymerization of said material without substantial combination of said agent with said material.

5. The process of polymerizing a material selected from the group consisting of rosin and rosin esters, which comprises treating said material in solution in a volatile organic solvent with a polymerizing agent selected from the group consisting of the mono-acyl and mono-alkyl substitution products of sulfuric acid, the proportion of said agent varying within the range of from about 20% to about 60% by weight based on the weight of said material, at a temperature within the range of from about 15° C. to about 35° C. for a period of time sufficient to bring about substantial polymerization of said material without substantial combination of said agent with said material.

6. The process of polymerizing a material selected from the group consisting of rosin and rosin esters, which comprises treating said material in solution in a volatile organic solvent with a polymerizing agent selected from the group consisting of the mono-acyl and mono-alkyl substitution products of sulfuric acid at a temperature within the range of from about 15° C. to about 35° C., the proportion of said agent being from about 5% to about 150% by weight based on the weight of said material, and agitating the mixture throughout the treatment so as to bring about substantial polymerization of said material without substantial combination of said agent with said material.

7. The process of polymerizing a material selected from the group consisting of rosin and rosin esters, which comprises treating said material in solution in a volatile organic solvent with a polymerizing agent selected from the group consisting of the mono-acyl and mono-alkyl substitution products of sulfuric acid at a temperature within the range of from about 15° C. to about 35° C., the proportion of said agent being from about 5% to about 150% by weight based on the weight of said material, and agitating the mixture throughout the treatment so as to bring about substantial polymerization of said material without substantial combination of said agent with said material, admixing an excess of water with the mixture, separating the solution of polymerized material from the water layer containing said agent, washing said solution of said polymerized material, and recovering said polymerized material from said washed solution by evaporation of the solvent therefrom.

8. The process of polymerizing a material selected from the group consisting of rosin and rosin esters, which comprises treating said material in solution in a volatile organic solvent with a polymerizing agent selected from the group consisting of the mono-acyl and mono-alkyl substitution products of sulfuric acid at a temperature within the range of from about 15° C. to about 35° C., the proportion of said agent being from about 5% to about 150% by weight based on the weight of said material, and agitating the mixture throughout the treatment so as to bring about substantial polymerization of said material without substantial combination of said agent with said material, allowing the mixture to separate into layers, the solution of polymerized material being supernatant, separating the supernatant solution layer from the acid sludge layer below, washing said solution layer and recovering the polymerized material therefrom by evaporation of the solvent.

9. The process of polymerizing a material selected from the group consisting of rosin and rosin esters, which comprises treating said material in solution in a volatile organic solvent with a polymerizing agent selected from the group consisting of the mono-acyl and mono-alkyl substitution products of sulfuric acid at a temperature within the range of from about 15° C. to about 35° C., the proportion of said agent being from about 20% to about 60% by weight based on the weight of said material, for a period of time varying from about 1 to about 5 hours so as to effect substantial polymerization of said material without substantial combination of said agent with said material.

10. The process of polymerizing a material selected from the group consisting of rosin and rosin esters, which comprises treating said material in solution in a volatile organic solvent with mono-ethyl sulfuric acid at a temperature within the range of from about 0° C. to about 100° C. for a period of time sufficient to bring about substantial polymerization of said material without substantial combination of said acid with said material.

11. The process of polymerizing a material selected from the group consisting of rosin and rosin esters, which comprises treating said material in solution in a volatile organic solvent with mono-acetyl sulfuric acid at a temperature within the range of from about 0° C. to about 100° C. for a period of time sufficient to bring about substantial polymerization of said material without substantial combination of said acid to said material.

12. The process of polymerizing rosin which comprises treating the rosin in solution in a volatile organic solvent with mono-ethyl sulfuric acid at a temperature within the range of from about 0° C. to about 100° C. for a period of time sufficient to bring about substantial polymerization of the rosin without substantial combination of said acid with said rosin.

13. The process of polymerizing rosin which comprises treating the rosin in solution in a volatile organic solvent with mono-acetyl sulfuric acid at a temperature within the range of from about 0° C. to about 100° C. for a period of time sufficient to bring about substantial polymerization of the rosin without substantial combination of said acid with said rosin.

14. The process of polymerizing a material selected from the group consisting of rosin and rosin esters, which comprises treating said material in solution in a volatile organic solvent with a polymerizing agent selected from the group consisting of the mono-acyl and mono-alkyl substitution products of sulfuric acid at a temperature of approximately 20° C. for a period of time sufficient to bring about substantial polymerization of said material without substantial combination of said agent with said material.

ALFRED L. RUMMELSBURG.